United States Patent
Do et al.

(10) Patent No.: US 7,516,249 B2
(45) Date of Patent: Apr. 7, 2009

(54) METHOD FOR AUTOMATICALLY DETERMINING I/O CONNECTOR CONFIGURATION

(75) Inventors: Phuc Ky Do, Morrisville, NC (US); John David Landers, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/671,981

(22) Filed: Sep. 25, 2003

(65) Prior Publication Data

US 2005/0071523 A1 Mar. 31, 2005

(51) Int. Cl.
*G06F 13/10* (2006.01)
*G06F 9/445* (2006.01)

(52) U.S. Cl. .............................. 710/16; 710/8; 717/173; 717/178

(58) Field of Classification Search ........................ None
See application file for complete search history.

(56) References Cited

U.S. PATENT DOCUMENTS

| | | | |
|---|---|---|---|
| 5,465,106 A | 11/1995 | Keech et al. | |
| 5,832,222 A | 11/1998 | Dziadosz et al. | |
| 5,963,650 A | 10/1999 | Simionescu et al. | |
| 6,009,480 A * | 12/1999 | Pleso | 710/8 |
| 6,216,252 B1 | 4/2001 | Dangelo et al. | |
| 6,324,692 B1 | 11/2001 | Fiske | |
| 6,668,376 B1 * | 12/2003 | Wang et al. | 717/178 |
| 7,269,746 B1 * | 9/2007 | Lada et al. | 713/300 |
| 2003/0182414 A1 * | 9/2003 | O'Neill | 709/223 |
| 2004/0203738 A1 * | 10/2004 | Janssen et al. | 455/426.1 |

FOREIGN PATENT DOCUMENTS

JP 2001117835 * 4/2001

* cited by examiner

*Primary Examiner*—Ilwoo Park
(74) *Attorney, Agent, or Firm*—Sawyer Law Group LLP

(57) ABSTRACT

A method for automatically determining a configuration of an I/O connector panel is disclosed. The method comprises the steps of providing information about the capabilities of the connector card to a memory within the connector card, examining the information in the memory. The method further includes downloading at least one driver to a system coupled to the I/O connector panel based upon the examined information.

6 Claims, 3 Drawing Sheets

METHOD FOR AUTOMATICALLY DETERMINING I/O CONNECTOR CONFIGURATION

FIELD OF THE INVENTION

The present invention relates generally to personal computers and more particularly to a system and method for determining the number of I/O products supported by the personal computer.

BACKGROUND OF THE INVENTION

One of the challenges in the current PC world is insuring that the right software drivers are present and installed in a system. In many situations, the drivers are not bundled with the operating system as it is installed. Drivers are typically shipped on a CDROM with the device. Upgrading drivers is typically a manual process.

In many cases, particularly in embedded computing applications, such as point-of-sale applications (POS), there is a continuous stream of new I/O products introduced. These products can use many different interfaces and connection schemes. A major challenge for users is to get the right drivers, at the right level, for the right operating system.

Accordingly, what is needed is a system and method for automatically determining the I/O connection configuration of a personal computer to allow for the retrieval of the appropriate driver. The present invention addresses such a need.

SUMMARY OF THE INVENTION

A method and system for automatically determining a configuration of an I/O connector panel is disclosed. The method and system comprises the steps of providing information about the capabilities of the connector card to a memory within the connector card, examining the information in the memory. The method and system further includes downloading at least one driver to a system coupled to the I/O connector panel based upon the examined information.

In a preferred embodiment, an EEROM is provided in the connector panel that contains details on connectors that are installed and the EEROM is easy to update. The I/O capabilities of a platform (as determined by an I/O panel or other hardware that contains some identification mechanism that defines the I/O capabilities) is within the connector card. This mechanism is then used to determine what software to "preload" into a system so that as new I/O devices are added in the field, the required software for these devices has already been preloaded. This is in contrast to conventional systems where either the software is loaded for all possible devices, or no software is loaded initially and then software loaded as new I/O devices are attached.

DETAILED DESCRIPTION

The present invention relates generally to personal computers and more particularly to a system and method for determining the number of I/O products supported by the personal computer. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
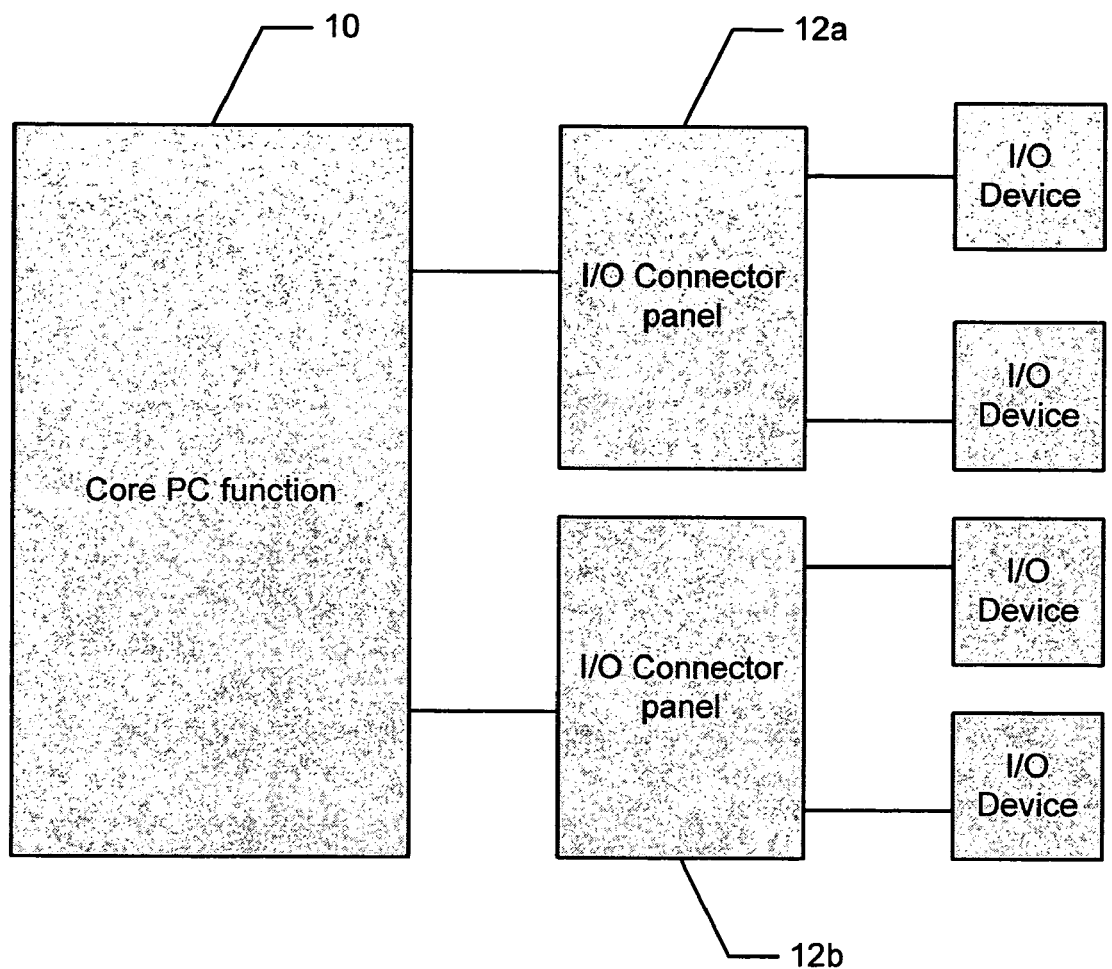
FIG. 1 represents a processing unit in accordance with the present invention.

FIG. 1 is a processing system 10 in accordance with the present invention. Referring to FIG. 1, the "core PC function" block 10 represents a processing unit (for example, a PC motherboard with I/O interfaces). The I/O connector panels 12*a-b* provides a connection point for the I/O devices to connect to the core PC function block 10.

Figure 2:
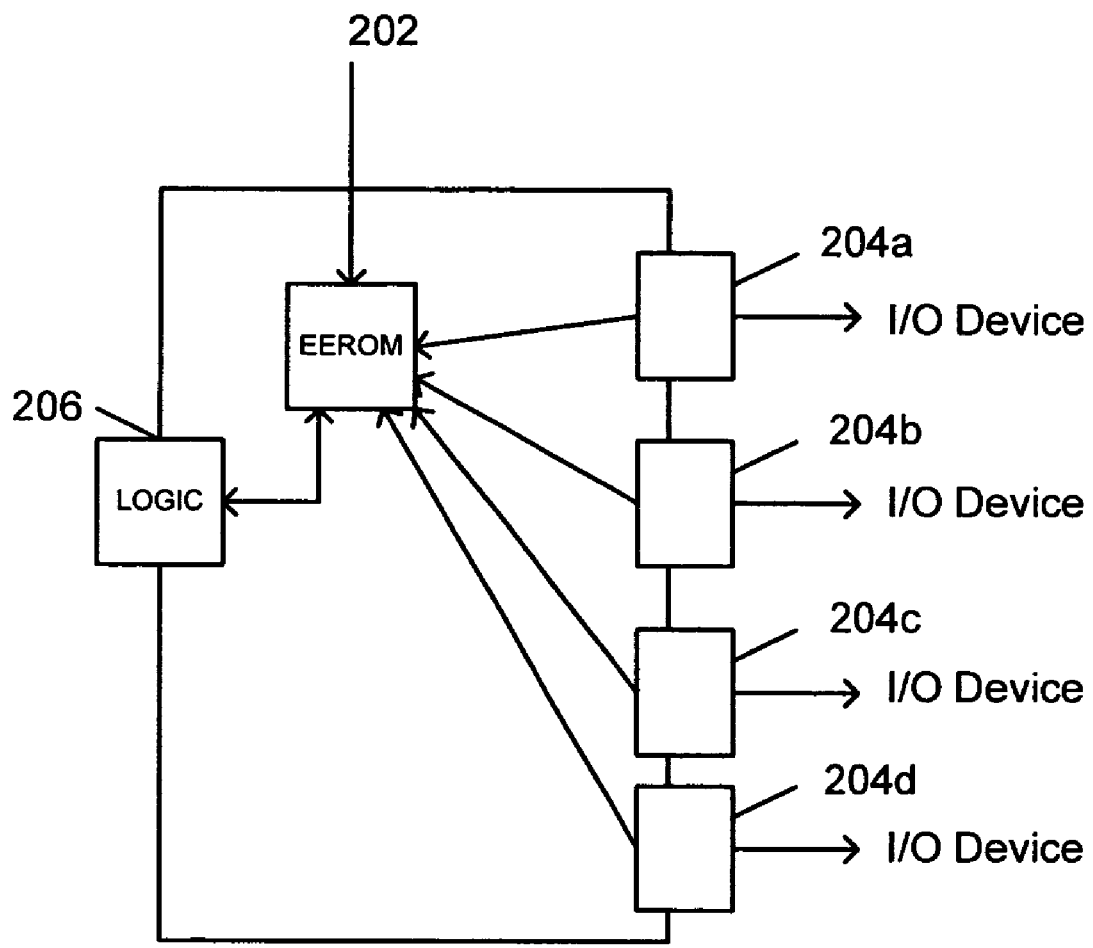
FIG. 2 illustrates a detailed view of a connector panel in accordance with the present invention.

FIG. 2 illustrates a detailed view of a connector panel 12 in accordance with the present invention. The connector panel 12 contains connector logic 206 required for I/O origination/termination, voltage distribution, etc. For instance, the connection between the core PC function 10 (FIG. 1) and an I/O connection panel 12 could be a USB channel, and the I/O connection panel 12 could obtain a USB hub along with specialized power connections so that multiple POS USB based devices could be driven from one connector panel.

The I/O connection panel 12 contains an EEROM 202 that contains unique information about the capabilities of that I/O connector panel 12. The EEROM 202 contains the attributes of the I/O panel type, and of each connector 204*a-d* installed on the connector panel 12. The EEROM 202 also contains the attributes of the connector logic 206 which links the connector card with the Core PC function block 10.

Figure 3:
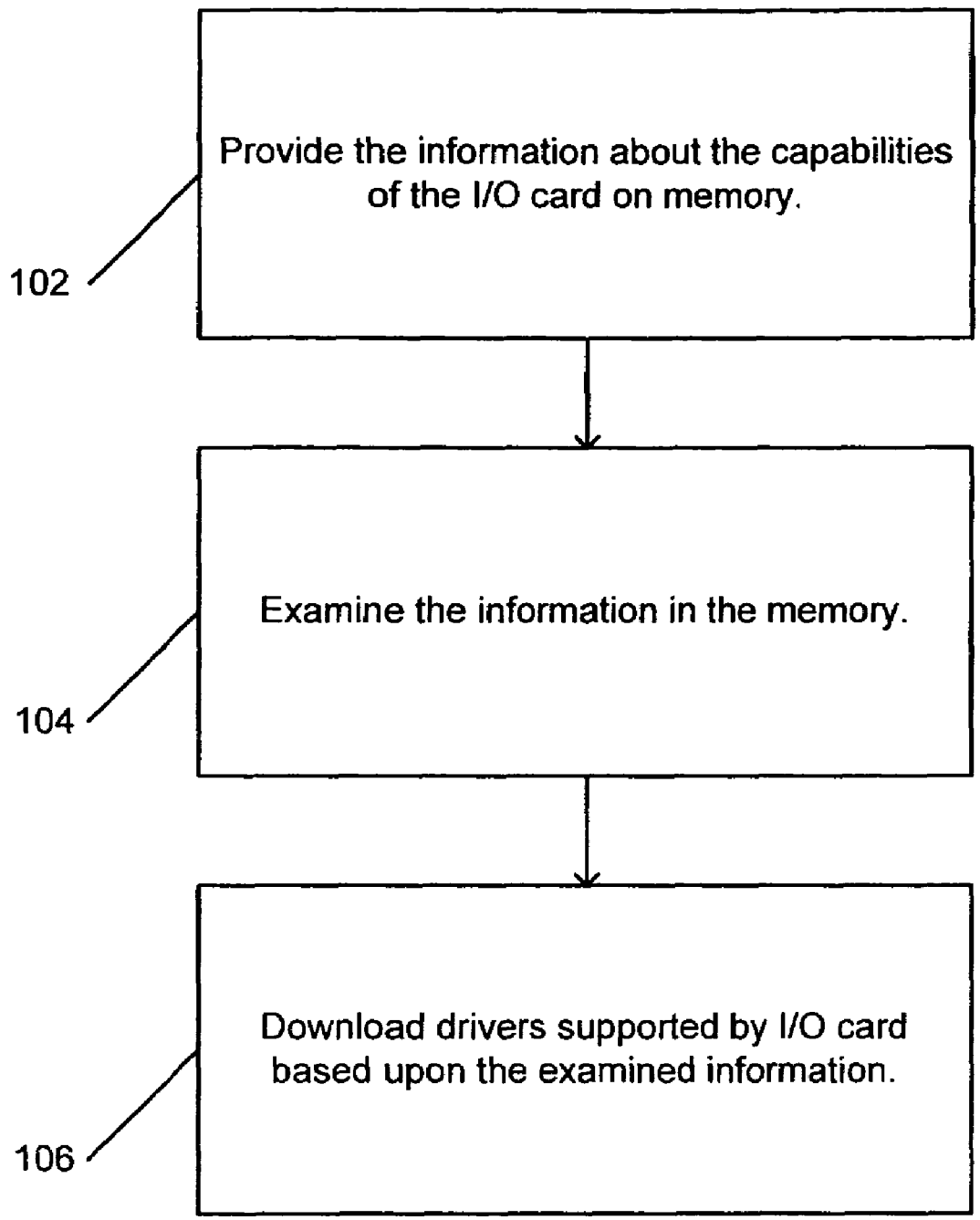
FIG. 3 is a simplified flow chart of a method for automatically determining a combination of an I/O connector card.

FIG. 3 is a simplified flow chart of a method for automatically determining a configuration of an I/O connector panel utilizing the above-described connector panel. First, information about the capabilities of the I/O connector card is provided to a memory within the card, via step 102. Next, the information in the memory is examined, via step 104. Finally, appropriate drivers supported by the I/O card are downloaded to the system coupled to the I/O connector card, via step 106.

Using this connection/detection methodology, it is possible to define many different architectures, as described in the following embodiments. In a first embodiment of the system in accordance with the present invention, the system (at boot time) examines the contents of EEROM 202. The contents of this EEROM describe the capabilities of what kinds of devices could be attached to that connector panel. The core PC function block 10 would initiate actions to go out on a public or private network and download a family of drivers that would work with devices capable of being supported by this I/O connection panel. This downloading process is driven by software that is independent of the type of panel. The system checks with a central source to see that it has drivers for a "Type A" panel or a "Type X" device connection.

The core PC function block 10 maintains a table that indicates whether drivers have been downloaded for a given connector or connector panel, along with date information for when the last download occurred. The core PC function block 10 could then use this table to determine if new downloads are necessary. The core PC function block 10 could then check with the central site to see if new updated drivers are required. It would also be possible for a central site to examine the system's "table" or installed devices (or even EEROM contents) to determine what drivers need to be pushed down into the terminal.

The following is an example of how the system in accordance with the present invention functions. A single printer is made available to customers. Different system units are designed that have different prices or functions (such as limited power, etc.). These different system units support different printer features, or simply provide extra printer function provided the user has bought an "upgraded" unit. It is desired to limit or enhance printer function based on the product it is attached to. The I/O connection card EEROM defines the type of driver for that printer to be installed (for instance, a low price or low power product might limit the printer to 10 lpm instead of 40 lpm). "Upgrades" to I/O function could be implemented simply by rewriting the contents of the EEROM.

All of this automatic functioning happens in the background, transparent to the user. The only thing required is a network connection, along with supporting software in the client and host site.

In a second embodiment of the system in accordance with the present invention, the connector card is utilized in conjunction with a point-of-sale (POS) system. Point-of-sale systems typically provide many I/O connectors to connect various I/O devices such as printers, displays, keyboards, etc. For a variety of reasons, there is a requirement for software (drivers, OS, applications and diagnostics) to understand the I/O capabilities of any particular machine. In the past, the matrix of I/O connectors has been fixed at the time of manufacture, and a specific machine type of model had a specific mix of connectors. Software could know the I/O connector mix simply by determining the specific machine that it was running in.

In another embodiment I/O connector panels can be utilized to provide features to the processor. These I/O connector panels will have different combinations of connectors (for example, RS232, USB, RS-485, all with different voltages present in the connectors). Since these I/O connector panels are now features, different I/O panels can be installed at the time of manufacture, as well as changed or upgraded in the field. There will likely be many different specific I/O panels, because they will be easy to design, and change/customized for specific customer requests (based on specific customer I/O requirements).

In this embodiment, a very small (128 bit) programmable memory (EEROM) is installed on each I/O panel card. These EEROMs can be read/written in a serial fashion and are used in many other parts of systems (for example, they are used to define the type/amount of memory on a DIMM). An extendable architecture is utilized for a structure in EEROM that will define to software the specific connector implementation on a given I/O panel. This memory module (which is installed on each I/O panel card) is programmed at the time of manufacture based on the specific I/O connectors installed on the I/O panel. Once the I/O panel is installed in the machine, the contents of the EEROM is read by the software and tells the software the exact I/O connector configuration of that particular I/O panel.

An architecture in accordance with the present invention could be easily extended to any type of system. As I/O connectors are added/removed, the contents of memory somewhere in the system are updated to indicate the I/O connector mix. This does not need to be tied to any specific mechanical implementation (I/O panel, etc.). For example, a PC could have the I/O mix stored in on board flash memory, in an EEROM, or in the non-volatile CMOS data area. As I/O connectors are changed, simple utility programs could be run that would update the contents of memory to accurately reflect the installed I/O mix.

It is important to note that there is no "automatic" way to define the contents of this EEROM module. This is done at the time the connectors are installed in the system and it is a manual process. While there may be mechanisms that will help automatically determine the connector types that are installed, a system and method in accordance with the present invention allows for the determination of thee types of connectors installed.

Advantges

The advantages of a system and method in accordance with the present invention are:

1. A family of drivers could be automatically downloaded at one time. This family of drivers would be available to the user, even if the specific I/O device was installed later. This would be particularly advantageous for situations where there would be a web connection available at configuration time, but not available (or only low speed connection available) when particular devices are added (such as a mobile environment).

2. Updates to these drivers could happen automatically at every boot, or selectively based on preferences established by the user, or hardware capabilities (i.e., only high speed connection, or when pushed from a central site).

3. Device function could actually be determined based not on the device, but on the capabilities of the "system" defined by the I/O connector panel/EEROM.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of for automatically determining a configuration of an I/O connector panel coupled to a system, the method comprising:

providing information about the capabilities of the I/O connector panel to a memory within the I/O connector panel, prior to connecting one or more peripherals to the I/O connector panel, wherein the I/O connector panel provides different combinations of connectors, wherein each connector provides a connection point between I/O devices and the system;

examining the information in the memory;

downloading from a network at least one driver that works with at least one I/O device capable of being supported by the I/O connector panel; and downloading the at least one driver to the system coupled to the I/O connector panel based upon the examined information, wherein the at least one driver downloaded from a network comprises a family of drivers, wherein the family of drivers are downloaded at the same time.

2. The method of claim 1 wherein the downloading step is provided by software that is independent of the type of I/O connector panel.

3. The method of claim 1 wherein the system includes a core PC function block that is configured independently of the I/O connector panel.

4. The method of claim 1 wherein the information comprises attributes of a type of the I/O connector panel, each connector installed on the I/O connector panel, and attributes of connector logic that links the I/O connector panel to the system.

5. The method of claim 1 further comprising:
maintaining a table that indicates whether particular drivers have been downloaded for a given I/O connector panel; and
utilizing the table to determine if any downloads are necessary.

6. The method of claim 1 wherein the different combinations of connectors comprise one or more of an Universal Serial Bus (USB) connector, RS232 connector, and an RS485 connector.

* * * * *